United States Patent [19]

Shimizu

[11] Patent Number: 4,684,078
[45] Date of Patent: Aug. 4, 1987

[54] TAPE CASSETTE HAVING A REEL SUPPORT STRUCTURE

[75] Inventor: Tokuzo Shimizu, Tokyo, Japan

[73] Assignee: Teac Corporation, Tokyo, Japan

[21] Appl. No.: 921,829

[22] Filed: Oct. 22, 1986

Related U.S. Application Data

[63] Continuation of Ser. No. 668,027, Nov. 5, 1984, abandoned.

[30] Foreign Application Priority Data

Nov. 7, 1983 [JP] Japan .................... 58-207595

[51] Int. Cl.⁴ .................... B65H 75/18; G11B 15/32
[52] U.S. Cl. .................... 242/199; 242/71.8
[58] Field of Search .................... 242/71.8, 197–200; 360/132, 137

[56] References Cited

U.S. PATENT DOCUMENTS

| | | | |
|---|---|---|---|
| 3,583,652 | 6/1971 | Merry | 242/55.19 A |
| 4,316,589 | 2/1982 | Stranders | 242/197 |
| 4,358,071 | 11/1982 | Okamura | 242/199 |
| 4,449,677 | 5/1984 | Ohta et al. | 242/199 |
| 4,452,408 | 6/1984 | Sasaki | 242/199 |
| 4,492,998 | 1/1985 | Kamimura et al. | 360/132 |

FOREIGN PATENT DOCUMENTS

| | | |
|---|---|---|
| 7138252 | 10/1971 | Fed. Rep. of Germany . |
| 2716725 | 10/1978 | Fed. Rep. of Germany . |
| 3324560 | 8/1984 | Fed. Rep. of Germany . |
| 0025882 | 2/1980 | Japan .................... 242/198 |
| 1246257 | 9/1971 | United Kingdom . |
| 1341829 | 12/1973 | United Kingdom . |
| 1426889 | 3/1976 | United Kingdom . |
| 1604521 | 12/1981 | United Kingdom . |
| 2089765A | 6/1982 | United Kingdom . |
| 2091202A | 7/1982 | United Kingdom . |
| 2099399A | 12/1982 | United Kingdom . |
| 2104967A | 1/1983 | United Kingdom . |
| 2104872A | 3/1983 | United Kingdom . |

Primary Examiner—John M. Jillions
Attorney, Agent, or Firm—Michael N. Meller

[57] ABSTRACT

A tape cassette comprises a pair of reels, and a cassette case for rotatably accommodating the reels. Each reel has a reel hub which is wound with a magnetic tape, a center hole and reel flanges provided on the reel hub. The cassette case has a pair of support parts for rotatably supporting the reel hubs of the reels so that the reels can rotate in a state where the reel flanges of the reels are separated from inner surfaces of the cassette case. Each of the support parts is constituted by a pair of annular projections formed on peripheries of two corresponding holes in the cassette case. Each annular projection projects toward the inside of the cassette case, and supports a corresponding one of the reel hubs solely by a tip end thereof.

7 Claims, 8 Drawing Figures

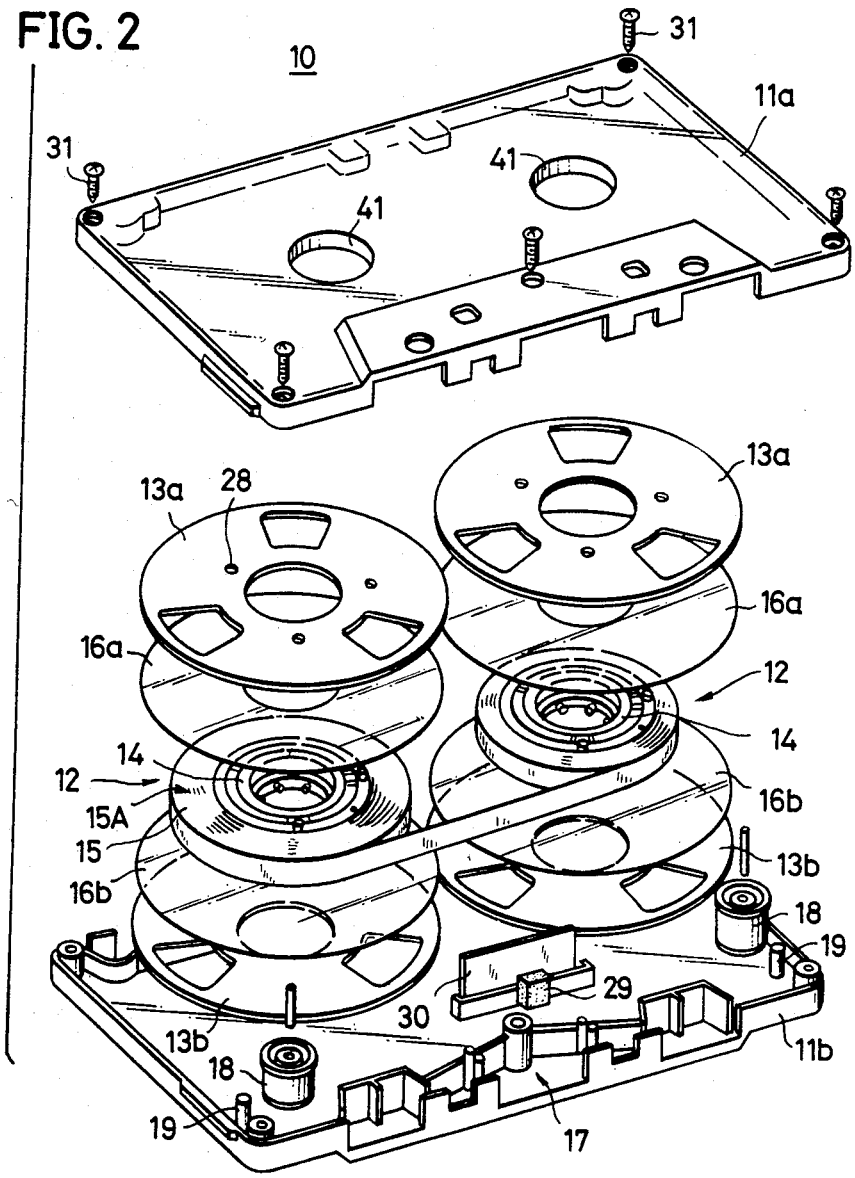

TAPE CASSETTE HAVING A REEL SUPPORT STRUCTURE

This application is a continuation of application Ser. No. 668,027, filed 11-5-84, now abandoned.

BACKGROUND OF THE INVENTION

The present invention generally relates to tape cassettes having a reel support structure, and more particularly to a tape cassette which accommodates tape reels having reel flanges and is provided with a reel support structure for rotatably supporting the tape reels.

A conventional tape cassette which is commonly available comprises a cassette case which rotatably accommodates a pair of reel hubs. A leader tape is connected to each end of a magnetic tape, and each leader tape is fixed to the corresponding reel hub so that the magnetic tape may be wound on the reel hubs. When the magnetic tape moves in such a tape cassette, the magnetic tape is paid out of one tape roll on one reel hub and is taken up on the other tape roll on the other reel hub. Thus, upper and lower surfaces of each tape roll, which are formed by upper and lower edges of the magnetic tape, respectively make contact with inner surfaces of the cassette case as the tape roll rotates. Accordingly, in this type of a tape cassette, synthetic resin sheets having a small frictional resistance are adhered on the inner surfaces of the cassette case. As a result, the upper and lower surfaces of each tape roll make contact with the synthetic resin sheets as the tape roll rotates, and the frictional resistance between the upper and lower surfaces of the tape roll and the synthetic resin sheets is kept to a minimum.

However, each tape roll makes contact with the synthetic resin sheets, over the entire area of the upper surface thereof and over the entire area of the lower surface thereof. The area over which one tape roll is in contact with the synthetic resin sheets depends on the diameter of the tape roll, however, the two tape rolls are in constant contact with the synthetic resin sheets over a relatively large area. Therefore, although the frictional resistance between the upper and lower surfaces of the tape rolls and the synthetic resin sheets as the tape rolls rotate is reduced due to the small frictional resistance of the synthetic resin sheets, a frictional resistance which cannot be neglected still exists between the upper and lower surfaces of the tape rolls and the synthetic resin sheets. The existence of such a frictional resistance interferes with the smooth and stable rotation of the tape rolls, and accordingly interferes with the smooth and stable movement of the magnetic tape.

On the other hand, another type of tape cassette has been developed. This other type of tape cassette comprises a cassette case which accommodates a pair of reels each having a reel hub provided with upper and lower reel flanges, instead of accommodating the reel hubs which are not provided with the reel flanges. When this other type of tape cassette is molded from a transparent resin, the reel flanges are visible through the cassette case from the outside. Hence, it is possible to improve the external appearance and give the tape cassette a high-grade appearance, by molding the reel flanges from a synthetic resin and forming metal or metal-like prints on the reel flanges. In addition, by putting colors, designs, or the like on the reel flanges, it is possible to give the tape cassette a surprisingly fine appearance which is unknown in the conventional tape cassette.

However, even in this other type of tape cassette, the reel flanges of each reel make contact with the inner surfaces of the cassette case. Thus, synthetic resin sheets having a small frictional resistance are adhered on the inner surfaces of the cassette case. As a result, the reel flanges of each reel make contact with the synthetic resin sheets as the reel rotates, and the frictional resistance between the reel flanges of each reel and the synthetic resin sheets is kept to a minimum. However, each reel makes contact with the synthetic resin sheets, over the entire area of the upper reel flange thereof and over the entire area of the lower reel flange thereof. Therefore, although the frictional resistance between the upper and lower reel flanges of the reels and the synthetic resin sheets as the reels rotate is reduced due to the small frictional resistance of the synthetic resin sheets, a frictional resistance which cannot be neglected still exists between the upper and lower reel flanges of the reels and the synthetic resin sheets. The existence of such a frictional resistance interferes with the smooth and stable rotation of the reels, and accordingly interferes with the smooth and stable movement of the magnetic tape. Consequently, there is a problem in that a large torque is required to rotate the reels.

SUMMARY OF THE INVENTION

Accordingly, it is a general object of the present invention to provide a novel and useful tape cassette having a reel support structure, in which the problems described heretofore are eliminated.

Another and more specific object of the present invention it to provide a tape cassette which accommodates a pair of reels each having a reel hub and reel flanges and which is provided with a reel support structure for rotatably supporting the reels such that each reel rotates with the reel flanges separated from inner surfaces of a cassette case. According to the tape cassette having the reel support structure of the present invention, the reel flanges of each reel do not make contact with the inner surfaces of the cassette case as the reel rotates. Hence, it is unnecessary to provide a synthetic resin sheet over the inner surfaces of the cassette case in their entirety, and there is no frictional resistance between the reel flanges and the inner surfaces of the cassette case as the reels rotate. As a result, the reels can rotate with extremely fine smoothness and stability, and a magnetic tape can move smoothly and stably. A frictional resistance exists between the reel hub part of each reel where the reel is supported and a corresponding support part of the cassete case as the reel rotates, however, the frictional resistance introduced at the support part is negligibly small because the area of the support part is small. Further, the position of the support part with respect to the reel is radially separated by only a small distance from the center of the reel, and only a small torque is required to rotate the reel against the frictional resistance introduced at the support part.

Other objects and further features of the present invention will be apparent from the following detailed description when read in conjunction with the accompanying drawings.

BRIEF DESCRIPTION OF THE DRAWINGS

FIG. 2 is a disassembled perspective view showing the tape cassette shown in FIG. 1;

DETAILED DESCRIPTION

Figure 1:
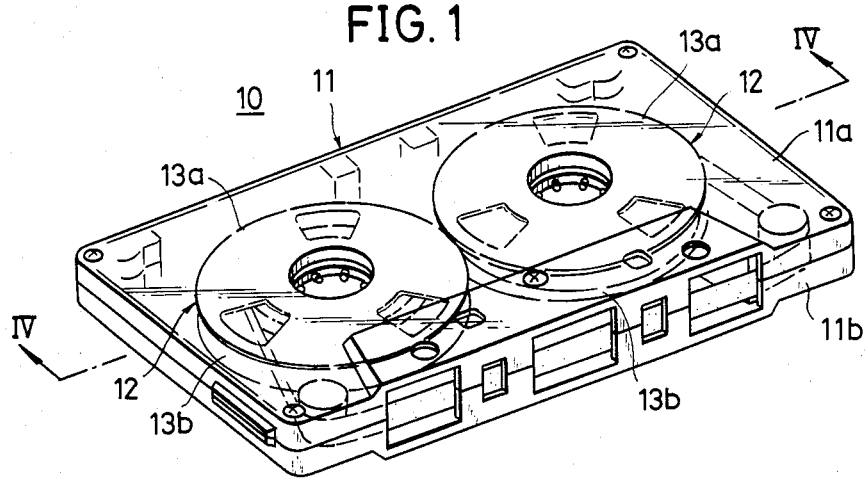
FIG. 1 is a perspective view showing an embodiment of a tape cassette according to the present invention.

As shown in FIG. 1, a tape cassette 10 generally comprises a cassette case 11 made up of upper and lower cassette halves 11a and 11b, and a pair of reels 12 which are rotatably supported within the cassette case 11. The cassette halves 11a and 11b are molded from a transparent synthetic resin, and reel flanges 13a and 13b of the reels 12 are visible through the cassette case 11 from the outside.

Figure 5:
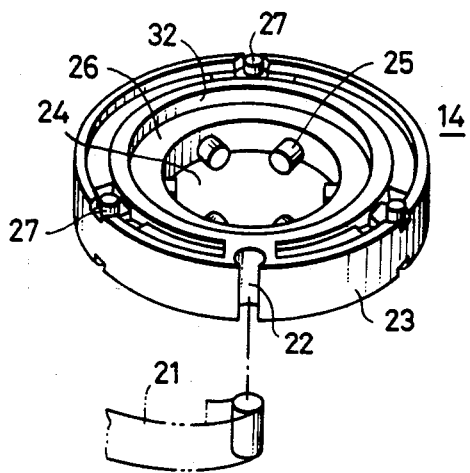
FIG. 5 is a perspective view showing a reel hub shown in FIG. 2.

A disassembled perspective view of the tape cassette 10 is shown in FIG. 2. The pair of reels 12 have the same construction, and description will be given only with respect to one of the reels 12. The same constituting parts of the reels 12 are designated by the same reference numerals, and description with respect to the other of the reels 12 will be omitted. A reel hub 14 of the reel 12 is made of a synthetic resin. As shown in FIG. 5, the reel hub 14 comprises a depression 22 for engaging the end part of a leader tape 21, and a tape winding surface 23 for winding thereon a magnetic tape 15 and the leader tape 21. A center hole 24 in the reel hub 14 fits over a reel driving shaft (not shown) of a recording and/or reproducing apparatus (not shown). Projections 25, which engage the reel driving shaft, project toward the center of the center hole 24. A stepped part 26 is formed in a ring shape around the periphery of the center hole 24, on both the upper and lower surfaces of the reel hub 14. For example, three fixing projections 27 are provided in the outer peripheral edge of the reel hub 14 each of which is surrounded by a recess part. The leader tape 21 is engaged to the depression 22 in the reel hub 14, and the leader tape 21 and the magnetic tape 15, which is connected to the leader tape 21, are wound around the winding surface 23 so as to form a tape roll 15A.

Circular sheets 16a and 16b, which are made of a transparent synthetic resin having a small frictional resistance, are inserted between the tape roll 15A and the pair of reel flanges 13a and 13b which are made of a metal (for example, aluminum). Small holes 28 in the reel flange 13a (13b) are engaged by the fixing projections 27 of the reel hub 14, and the fixing projections 27 are welded so as to fix the reel flange 13a (13b) to the reel hub 14. The circular sheets 16a and 16b prevent the upper and lower edges of the magnetic tape 15 from making direct contact with the reel flanges 13a and 13b when the magnetic tape 15 moves, that is, when the magnetic tape 15 is paid out from or is taken up on the tape roll 15A. The frictional resistance between the edges of the magnetic tape 15 and the circular sheets 16a and 16b is small.

A tape guide part 17 for guiding the magnetic tape 15 along a predetermined tape moving path, tape guide rollers 18, tape guide pins 19, and the like are provided on the lower cassette half 11b. A felt pad 29, a shield plate 30, and the like are mounted on the tape guide part 17. The upper and lower cassette halves 11a and 11b are fixed together by screws 31 in a state where the reels 12 are accommodated within the cassette halves 11a and 11b.

Figure 3:
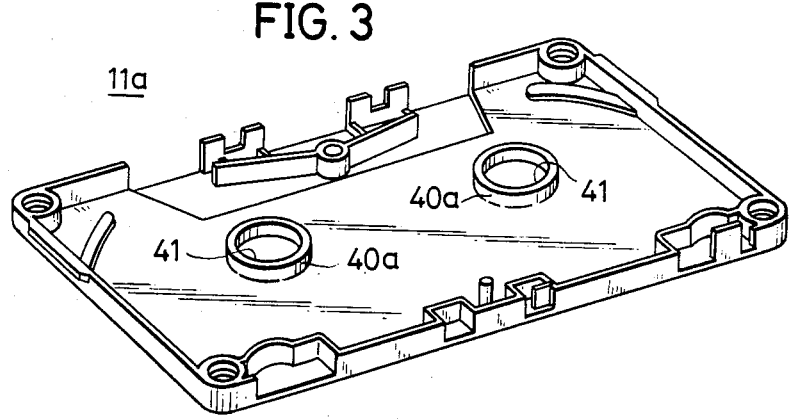
FIG. 3 is a perspective view showing an upper half of a cassette case shown in FIG. 2.
Figure 4:
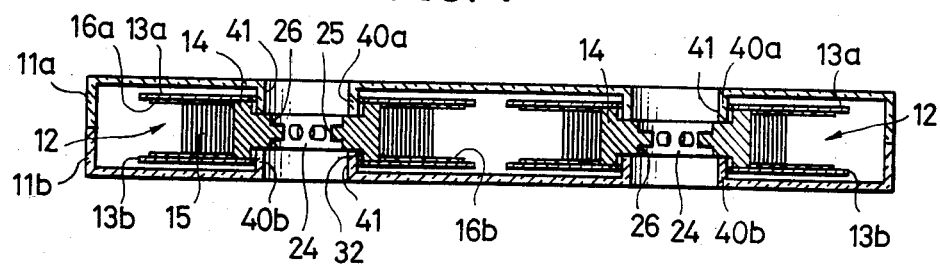
FIG. 4 is an elevation showing a vertical cross section of the tape cassette along lines IV—IV in FIG. 1.

As shown in FIG. 3, annular projections 40a are integrally formed on the inner surface of the upper cassette half 11a. The annular projections 40a are formed around the peripheral edges of holes 41 which fit over the reel driving shafts of the recording and/or reproducing apparatus. The annular projections 40a rotatably support the reel hubs 14 of the corresponding reels 12. In addition, as shown in FIG. 4, annular projections 40b, having the same shape as the annular projections 40a, are integrally formed on the inner surface of the lower cassette half 11b. The inner diameter of the annular projections 40a and 40b, that is, the diameter of the holes 41, is selected to be approximately equal to or slightly larger than the diameter of the center holes 24. The annular projections 40a and 40b project from the upper and lower cassette halves 11a and 11b by a predetermined distance, so that when the upper and lower cassette halves 11a and 11b are assembled together as shown in FIG. 4, the distance between the tip ends of the annular projections 40a and 40b is slightly larger than the thickness of the stepped parts 26 of the reel hub 14. The predetermined distance is also selected so that one of the stepped parts 26 on the upper and lower surfaces of the reel hub 14 makes contact with and is supported by the annular projections 40a and 40b, and the reel flanges 13a and 13b are separated from the inner surfaces of the upper and lower cassette halves 11a and 11b. The outer diameter of the stepped parts 26 is slightly larger than the outer diameter of the annular projections 40a and 40b. Accordingly, the reel 12 is rotatably supported by the annular projections 40a and 40b, in a state where there is a slight play in the radial direction of the reel 12 so that the reel driving shaft of the recording and/or reproducing apparatus can easily enter within the center hole 24. The movement of the reel 12 in the radial direction thereof is restricted when outer peripheral walls 32 of the stepped parts 26 of the reel hub 14 make contact with the outer peripheral surfaces of the annular projections 40a and 40b.

Thus, the reel 12 is supported solely by the tip end surfaces of the annular projections 40a and 40b which engage with the stepped parts 26 of the reel hub 14. Because the area of the tip end surfaces of the annular projections 40a and 40b is extremely small, the area of the annular projections 40a and 40b in contact with the reel hub 14 is extremely small. Moreover, the reel flanges 13a and 13b are separated from and do not make contact with the inner surfaces of the upper and lower cassette halves 11a and 11b. As a result, the frictional resistance which is introduced at the annular projections 40a and 40b, which constitute the rotation support part of the reel 12, is extremely small as the reel 12 rotates.

Further, the reel 12 is supported at a position which is radially separated by only a small distance from the center of the reel 12. In other words, the reel 12 is supported at the stepped parts 26 which is radially separated by only a small distance from the center of the reel 12. Hence, the braking force or torque which acts on the reel 12 due to the frictional resistance between the annular projections 40a and 40b and the stepped parts 26, is small. Accordingly, the reel 12 is rotatably supported in a state where the braking force acting on the reel 12 due to the frictional resistance is extremely small, so that the reel 12 can be rotated smoothly and stably by a small torque. In addition, since the reel flanges 13a and 13b do not make contact with the cassette halves 11a and 11b, it is unnecessary to provide sheets on the inner surfaces of the cassette halves for reducing the frictional resistance as in the case of the conventional tape cassette.

Figures 6A, 6B:
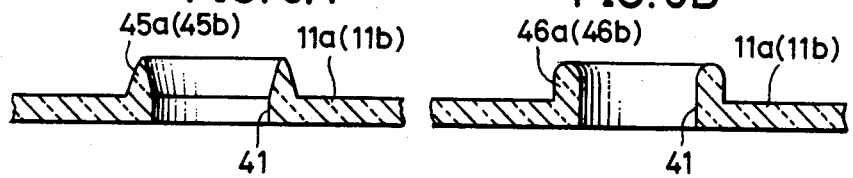
FIGS. 6A and 6B are views in vertical cross section showing modifications of reel hub support parts provided on the cassette case.

The annular projections provided on the upper and lower cassette halves 11a and 11b may have other shapes as may be seen in the modifications shown in FIGS. 6A and 6B. In the first modification shown in FIG. 6A, an annular projection 45a (45b) has a thickness which is considerably smaller towards the tip end part thereof. As a result, the area of the tip end part of the annular projection 45a (45b) in contact with the stepped part 26 of the reel hub 14 is extremely small, and the frictional resistance introduced as the reel 12 rotates is further reduced.

In the second modification shown in FIG. 6B, an annular projection 46a (46b) has a shap similar to the annular projection 40a (40b) except that the tip end part of the annular projection 46a (46b) is rounded. Thus, the area of the tip end part of the annular projection 46a (46b) is extremely small, and the frictional resistance introduced as the reel 12 rotates is reduced. When the tip end part of the annular projection is flat as in the case of the annular projection 40a (40b), there is a problem in that a burr of flash is easily introduced at the edge part and the burr of flash may make contact with the stepped parts 26 and interfere with the rotation of the reel hub 14. On the other hand, according to the second modification, the tip end part of the annular projectiong 46a (46b) is rounded, and the above problem is eliminated.

Figure 7:
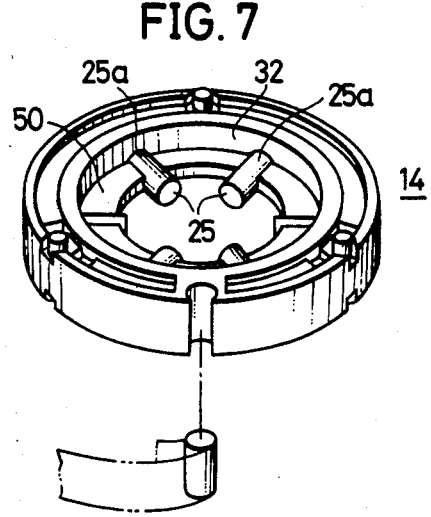
FIG. 7 is a perspective view showing a modification of the reel hub.

In addition, the stepped parts of the reel hub 14 may be shaped as shown in the modification shown in FIG. 7. In FIG. 7, the thickness of stepped parts 50 of the reel hub 14 is smaller than the thickness of the stepped parts 26 of the reel hub 14 shown in FIG. 5. Hence, parts of the projections 25, which engage with the reel driving shaft of the recording and/or reproducing apparatus, are formed on the extensions of the stepped parts 50. As a result, cylindrical parts 25a are formed on the stepped parts 26. When the reel hub 14 shown in FIG. 7 is accommodated within the upper and lower cassette halves 11a and 11b, the annular projections 40a and 40b (or 45a and 45b, or 46a and 46b) only make contact with the top surfaces of the cylindrical parts 25a. For this reason, the area of the reel hub 14 in contact with the annular projections is reduced even further, and the frictional resistance introduced between the reel hub 14 and the annular projections is reduced even further.

Further, the present invention is not limited to these embodiments, but various variations and modifications may be made without departing from the scope of the present invention.

What is claimed is:

1. A tape cassette comprising:
a pair of reels each having a reel hub around which a magnetic tape is wound, a center hole and reel flanges provided on the reel hub, each of said reel hubs having a pair of stepped parts and a pair of hub surfaces on which said reel flanges are mounted; and
a cassette case for rotatably accommodating the reels, said cassette case having two holes formed in correspondence with each of said center holes,
said cassette case having a pair of support parts for rotatably supporting the reel hubs of said reels, each of said support parts comprising a pair of annular projections formed on peripheries of the two corresponding holes in the cassette case, each annular projection projecting by a predetermined distance toward the inside of the cassette case and a corresponding one of said reel hubs being supported solely by a tip end thereof, said predetermined distance having a value such that a distance between the tip ends of said pair of annular projections is larger than a distance between said pair of stepped parts of each reel hub and each of the reel flanges is separated from an inner surface of said cassette case,
said pair of hub surfaces each having at least one fixing projection and a recess part surrounding said fixing projection, each of said reel flanges having at least one mounting hole into which said fixing projection fits to secure the reel flange to the reel hub.

2. A tape cassette as claimed in claim 1 in which each of said stepped parts has a ring shape, and said reels are supported in a state where each of said stepped parts is fitted with and makes contact with the tip end of the corresponding annular projection of the cassette case.

3. A tape cassette as claimed in claim 1 in which each of said annular projections has a thickness which decreases toward the tip end thereof to form a sharp annular top thereof.

4. A tape cassette as claimed in claim 1 in which each of said annular projections has a tip end which is rounded.

5. A tape cassette as claimed in claim 2 in which each of said stepped parts comprises a ring shaped and narrow flat surface which makes contact with and is supported by the tip end of the corresponding annular projection, and an outer peripheral wall which makes contact with an outer peripheral surface of the corresponding annular projection so as to restrict the movement of the corresponding reel hub in a radial direction of the reel hub.

6. A tape cassette comprising:
a pair of reels each having a reel hub around which a magnetic tape is wound, a center hole and reel flanges provided on the reel hub, each of said reel hubs having a pair of stepped parts having a ring shape, each of said stepped parts comprising a plurality of projecting parts formed in the radial direction of the corresponding reel hub; and
a cassette case for rotatably accomodating the reels, said cassette case having two holes formed in correspondence with each of said center holes,
said cassette case having a pair of support parts for rotatably supporting the reel hubs of said reels such that said reels can rotate in a state where each of the reel flanges of said reels is separated from an inner surface of said cassette case, each of said support parts comprising a pair of annular projections formed on peripheries of the two corresponding holes in the cassette case, each annular projection projecting toward the inside of the cassette case, said projecting parts making contact with and being supported by a tip end of the corresponding annular projection.

7. A tape cassette as claimed in claim 6 in which each of said reel hubs comprises a plurality of projections which project toward the center of the center hole thereof, and said projecting parts are cylindrical surfaces of said projections formed on the extension of the corresponding stepped part.

* * * * *